F. W. HOCHSTETTER.
SCREEN FOR EXHIBITING MOVING PICTURES.
APPLICATION FILED MAR. 22, 1919.

1,372,620.  Patented Mar. 22, 1921.

WITNESS
INVENTOR
Frederick W. Hochstetter
BY
ATTORNEY

UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

SCREEN FOR EXHIBITING MOVING PICTURES.

1,372,620.　　　　　Specification of Letters Patent.　　Patented Mar. 22, 1921.

Application filed March 22, 1919. Serial No. 284,389.

*To all whom it may concern:*

Be it known that I, FREDERICK W. HOCHSTETTER, a citizen of the United States, and a resident of New York, county and State of New York, have invented a certain new and useful Improvement in Screens for Exhibiting Moving Pictures, of which the following is a full, clear, and exact specification.

This invention relates to a class of devices adapted to be used in conjunction with the exhibition of moving pictures.

My invention has for its object primarily to provide a screen whereby moving pictures may be projected especially from the rear of the screen for exhibition to an audience in front thereof instead of being projected in the usual manner on the front surface of the screen, thus largely avoiding the necessity of subjecting the persons in the audience to the danger of fire, though the screen may be employed for front projection as occasion requires, and which tends to modify the harshness of the high lights for causing the objects in the pictures to appear in pronounced stereoscopic effects, the screen being adaptable for use in the projection of moving pictures in natural colors, or in black and white. The invention consists essentially of a transparent plate, the transparency of which is converted to a translucency by grounding the surfaces of the plate, and on both surfaces of the converted plate is applied a coating of oily material which is tinted a light blue color to partially clear the opaqueness of the plate as well as serving to tone the sharp high lights of the photography of the pictures when projected on the screen.

A further object of the invention is to provide a screen adapted to be made in various sizes, and which may be mounted in any suitable manner so as to be positioned in the optical axis of the lens of a moving picture machine.

A practical embodiment of the invention is represented in the accompanying drawing forming a part of this specification in which similar characters of reference indicate corresponding parts in all the views, the said invention being more fully described hereinafter, and then pointed out in the claim at the end of the description.

Figure 1:
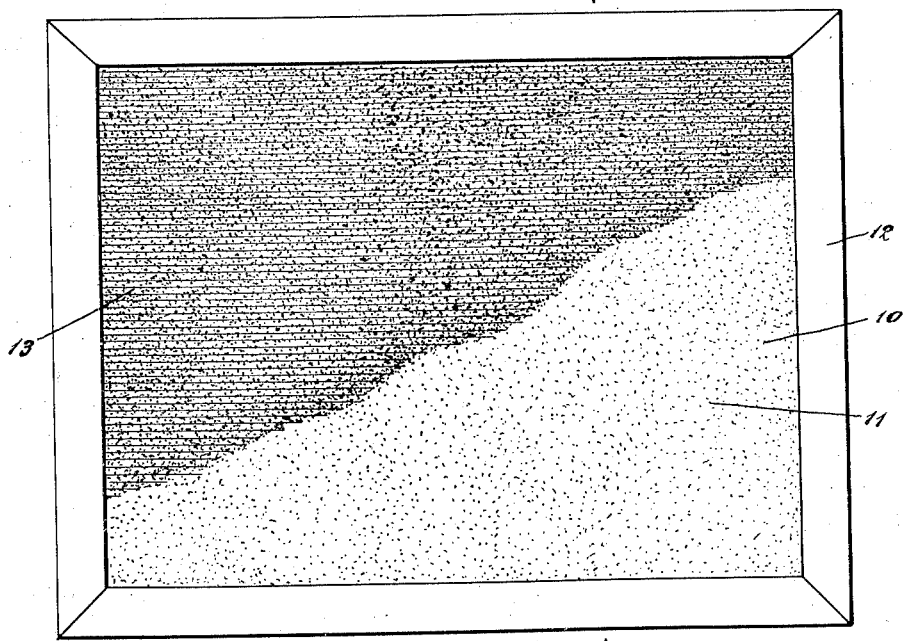
Figure 2:
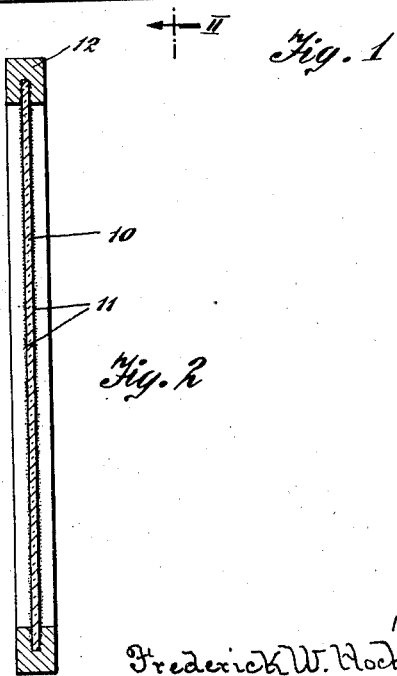

In the drawing, Figure 1 is a front elevation of one form of screen for exhibiting moving pictures embodying my invention, and Fig. 2 is a sectional view taken on the line II—II of Fig. 1.

The screen for exhibiting moving pictures is formed of a transparent plate 10 preferably of clear, uncolored plain glass, and the transparency of this plate is converted to a translucency, as at 11, by grounding to a very fine grain both surfaces of the plate with the use of a sand blast, or the employment of other means. The plate may then be mounted in a frame, or support, as 12, arranged on a stage, or platform, or otherwise in front of the auditorium of a theater, public hall, and elsewhere so as to be positioned in the optical axis of the lens of a moving picture projecting machine preferably operated at the rear of the screen for projection of the pictures on the back surface of the translucent plate.

On both surfaces of the translucent plate is then applied a coating, as 13, of an oily substance preferably castor oil which is first tinted to a light blue by incorporating thereinto a suitable quantity of transparent blue coloring, this coating serving to partially clear the opaqueness of the translucent plate. The coating of colored oil is applied to the plate by the use of a soft pad of cloth, chamois, or other soft material containing a quantity of the colored oil which is frictionally rubbed into both of the ground surfaces of the plate.

After all the surplus of the colored oil is cleared from the plate, the moving pictures in either natural colors, or in black and white effects are projected thereon in the usual manner. The pictures will thereby appear to the persons in the audience in pronounced stereoscopic effects by the sharp high lights being toned which will cause the actions of the animated objects in the pictures to seem very life-like. When pictures in natural colors are projected the harshness of the unusually brilliant colors which tend to flash light will be modified by absorption in the fabrication of the screen in a manner which prevents overshadowing of the weaker tints, thereby producing as a whole the true color values of the objects. While this screen is preferably designed for use for the projection of moving pictures from the rear of the screen, to largely eliminate subjecting the persons in the audience to the danger of fire, the screen is equally as adaptable for efficiently exhibiting moving pictures by a front projection.

In the foregoing description, I have embodied the preferred form of my invention, but I do not wish to be understood as limiting myself strictly to the use of a glass plate, or to the use of a particular oily material, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

A screen of the character described comprising a plate of clear glass having both of its surfaces ground to a fine grain whereby the plate is made translucent, and a coating of colored oil on both of said ground surfaces.

This specification signed and witnessed this 21st day of March, A. D. 1919.

FREDERICK W. HOCHSTETTER.

Witnesses:
J. FREDERICK CRYER,
D. KOEPER.